US009931811B2

(12) United States Patent
Rummer et al.

(10) Patent No.: US 9,931,811 B2
(45) Date of Patent: *Apr. 3, 2018

(54) ADHERING SYSTEMS

(75) Inventors: Douglas William Rummer, Waterford, OH (US); Bernard F. Ball, Sr., Parkersburg, WV (US)

(73) Assignee: Magnum Magnetics Corporation, Marietta, OH (US)

(*) Notice: Subject to any disclaimer, the term of this patent is extended or adjusted under 35 U.S.C. 154(b) by 76 days.

This patent is subject to a terminal disclaimer.

(21) Appl. No.: 13/047,669

(22) Filed: Mar. 14, 2011

(65) Prior Publication Data
US 2011/0223428 A1 Sep. 15, 2011

Related U.S. Application Data

(60) Provisional application No. 61/314,094, filed on Mar. 15, 2010, provisional application No. 61/333,224, filed on May 10, 2010.

(51) Int. Cl.
*B32B 15/08* (2006.01)
*B31B 1/62* (2006.01)
(Continued)

(52) U.S. Cl.
CPC .............. *B32B 7/12* (2013.01); *B32B 5/16* (2013.01); *B32B 7/02* (2013.01); *B32B 9/02* (2013.01); *B32B 9/045* (2013.01); *B32B 21/08* (2013.01); *B32B 27/08* (2013.01); *B32B 27/10* (2013.01); *B32B 27/32* (2013.01); *B32B 29/002* (2013.01); *B32B 37/14* (2013.01); *B32B 2255/08* (2013.01); *B32B 2255/10* (2013.01); *B32B 2255/12* (2013.01); *B32B 2255/26* (2013.01); *B32B 2264/10* (2013.01); *B32B 2264/105* (2013.01); *B32B 2264/107* (2013.01);
(Continued)

(58) Field of Classification Search
CPC . B32B 21/08; B32B 2255/08; B32B 2255/10; B32B 2255/12; B32B 2255/26; B32B 2264/10; B32B 2264/105; B32B 2264/107; B32B 2307/208; B32B 2307/306; B32B 2307/518; B32B 2307/546; B32B 2307/75; B32B 27/08; B32B 27/10; B32B 27/32; B32B 29/002; B32B 37/14; B32B 5/16; B32B 7/02; B32B 7/12; B32B 9/02; B32B 9/045; Y10T 156/10; Y10T 428/31551; Y10T 428/31692; Y10T 428/31938
USPC ................. 428/423.1, 424.8, 461; 156/60
See application file for complete search history.

(56) References Cited

U.S. PATENT DOCUMENTS 4,485,222 A * 11/1984 Parekh ..................... 525/517
4,775,593 A 10/1988 Heberger et al.
(Continued)

FOREIGN PATENT DOCUMENTS

EP 0565752 A1 4/1992
EP 0581564 A1 2/1994
(Continued)

*Primary Examiner* — Thao T Tran
(74) *Attorney, Agent, or Firm* — Vorys, Sater, Seymour and Pease LLP; William L. Klima

(57) ABSTRACT

Adhering systems for magnetizable laminates to assist preventing delamination of magnetizable laminates exposed to direct sunlight; and, relating to preventing fouling of cutting blades during cutting of magnetizable laminates.

19 Claims, 4 Drawing Sheets

(51) Int. Cl.
  *B32B 27/40* (2006.01)
  *B32B 7/12* (2006.01)
  *B32B 7/02* (2006.01)
  *B32B 37/14* (2006.01)
  *B32B 5/16* (2006.01)
  *B32B 9/02* (2006.01)
  *B32B 9/04* (2006.01)
  *B32B 21/08* (2006.01)
  *B32B 27/08* (2006.01)
  *B32B 27/10* (2006.01)
  *B32B 27/32* (2006.01)
  *B32B 29/00* (2006.01)

(52) U.S. Cl.
  CPC ... *B32B 2307/208* (2013.01); *B32B 2307/306* (2013.01); *B32B 2307/518* (2013.01); *B32B 2307/546* (2013.01); *B32B 2307/75* (2013.01); *Y10T 156/10* (2015.01); *Y10T 428/31551* (2015.04); *Y10T 428/31692* (2015.04); *Y10T 428/31938* (2015.04)

(56) References Cited

U.S. PATENT DOCUMENTS

| | | | |
|---|---|---|---|
| 4,867,312 A * | 9/1989 | Comert et al. | 206/447 |
| 5,097,010 A * | 3/1992 | Markle et al. | 528/390 |
| 5,221,398 A * | 6/1993 | Williams | 156/281 |
| 5,762,741 A | 6/1998 | Kokokian | |
| 5,763,074 A | 6/1998 | Kohl et al. | |
| 6,468,678 B1 | 10/2002 | Dahlin et al. | |
| 6,714,114 B2 | 3/2004 | Matsumura et al. | |
| 6,749,750 B2 | 6/2004 | Barbera-Guillem et al. | |
| 6,828,009 B2 | 12/2004 | Benz et al. | |
| 7,338,573 B2 * | 3/2008 | Boudouris et al. | 156/244.11 |
| 2002/0120088 A1 * | 8/2002 | Hellwig et al. | 528/44 |
| 2002/0160231 A1 | 10/2002 | Schneider et al. | |
| 2003/0152766 A1 * | 8/2003 | Vargo | B32B 7/12 428/343 |
| 2005/0142341 A1 | 6/2005 | Carls et al. | |
| 2005/0186439 A1 * | 8/2005 | Staadecker et al. | 428/480 |
| 2006/0127435 A1 * | 6/2006 | Van Voris et al. | 424/405 |
| 2007/0128367 A1 * | 6/2007 | Tabakovic et al. | 427/373 |
| 2008/0099136 A1 | 5/2008 | Krebs et al. | |
| 2010/0028667 A1 | 2/2010 | Love | |
| 2011/0223428 A1 | 9/2011 | Rummer et al. | |
| 2013/0157063 A1 * | 6/2013 | Rummer et al. | 428/423.1 |

FOREIGN PATENT DOCUMENTS

| | | | |
|---|---|---|---|
| JP | 2000006351 A | 1/2000 | |
| JP | 2005036128 A * | 2/2005 | C09J 175/04 |
| WO | 03040249 A2 | 9/2006 | |

* cited by examiner

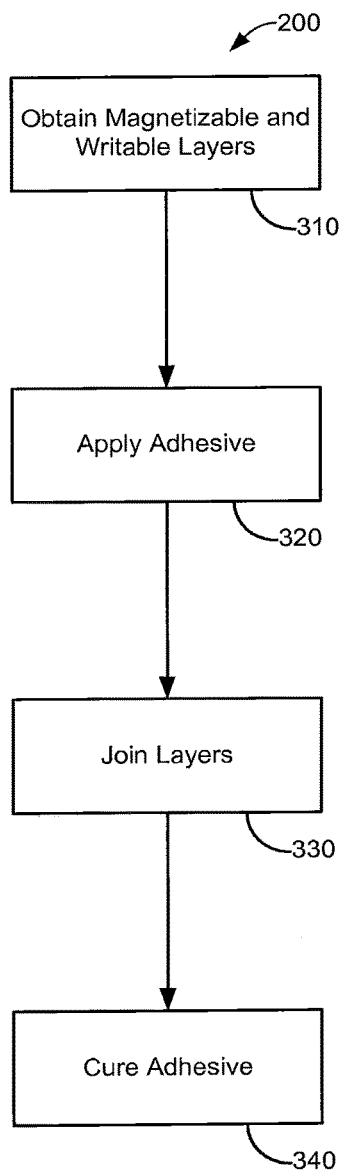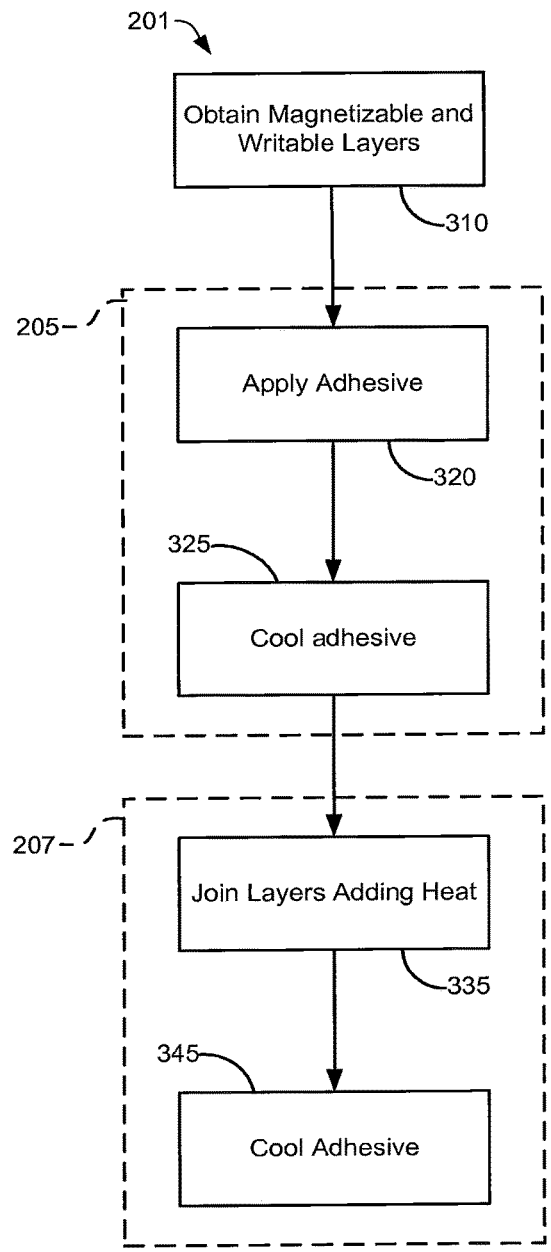
FIG. 3
FIG. 6

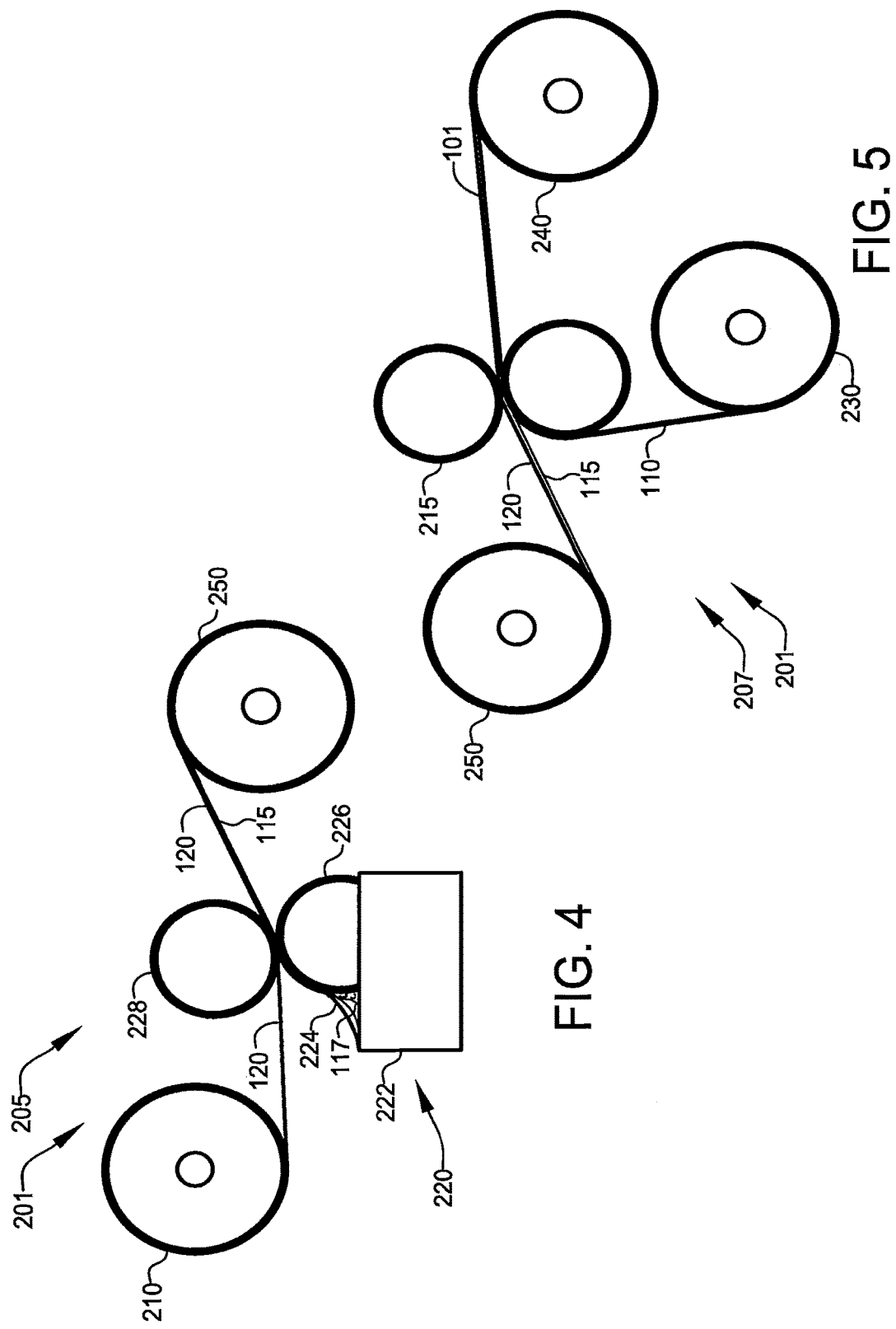

ary, this invention relates to using such adhering systems in
ADHERING SYSTEMS

CROSS-REFERENCE TO RELATED APPLICATION

The present application is related to and claims priority from prior provisional application Ser. No. 61/314,094, filed Mar. 15, 2010, entitled "ADHERING SYSTEMS"; and, this application is related to and claims priority from prior provisional application Ser. No. 61/333,224, filed May 10, 2010, entitled "ADHERING SYSTEMS", the contents of all of which are incorporated herein by this reference and are not admitted to be prior art with respect to the present invention by the mention in this cross-reference section.

BACKGROUND

This invention relates to adhering systems. More particularly, this invention relates to using such adhering systems in connecting materials.

In the past, manufacturers and users of flexible magnetizable sheets have experienced problems relating to delamination when exposed to heat (like in direct sunlight); yet it is often desirable to utilize flexible magnetized laminate sheets in areas exposed to direct sunlight.

Additionally, manufacturers and users of flexible magnetizable sheets have experienced problems relating to adhesive buildup on blades used to cut flexible magnetizable sheets. Often the cutting blades become warm during the cutting process and the adhesive begins to foul the cutting blades. Once the blades are fouled, the cutting process must be stopped and the blades cleaned; or the adhesive residue will begin to hinder cutting and transfer to the surface of the flexible magnetic sheets.

OBJECTS AND FEATURES OF THE INVENTION

A primary object and feature of the present invention is to provide systems overcoming the above-mentioned problems.

It is a further object and feature of the present invention to provide such systems utilizing preferred adhesives and adhering systems.

Another primary object and feature of the present invention is to provide such systems having resistance to heat-induced delamination.

A further object and feature of the present invention is to provide such systems having an adhesive left non-tacky after curing.

It is yet another object and feature of the present invention to provide such systems which, when undergoing cutting procedures, prevent buildup of adhesive materials on cutting blades.

A further primary object and feature of the present invention is to provide such a system that is efficient, inexpensive, and handy. Other objects and features of the present invention will become apparent with reference to the following descriptions.

SUMMARY OF THE INVENTION

In accordance with a preferred embodiment hereof, this invention provides a system, relating to preventing delamination of magnetizable laminates exposed to direct sunlight and relating to preventing fouling of cutting blades during cutting of magnetizable laminates, such system comprising: at least one flexible magnetizable laminate comprising at least two layers; wherein such at least two layers comprises at least one magnetizable layer structured and arranged to be capable of magnetization; and at least one adhesive structured and arranged to adhere such at least two layers together; wherein such at least one adhesive is resistant to transfer from such at least one flexible magnetizable laminate to the cutting blades during cutting of such at least one flexible magnetizable laminate; and wherein such at least one flexible magnetizable laminate is resistant to delamination during use in direct sunlight.

The compositions described below in percentages (%) are weight percentages (wt %).

Moreover, it provides such a system wherein such at least one adhesive comprises at least one hot-melt adhesive. Additionally, it provides such a system wherein such at least one adhesive comprises at least one reactive hot-melt adhesive. Also, it provides such a system wherein such at least one adhesive comprises at least one virtually-thermosetable hot-melt adhesive. In addition, it provides such a system wherein such at least one adhesive comprises at least one humidity-curable adhesive structured and arranged to cure using humidity. And, it provides such a system wherein such at least one adhesive comprises primarily polyurethane. Further, it provides such a system wherein such at least one adhesive comprises at least about 90% polyurethane. Even further, it provides such a system wherein such at least one adhesive comprises at least about 95% polyurethane. Moreover, it provides such a system wherein such at least one adhesive comprises at least one thermoplastic hot-melt adhesive. Additionally, it provides such a system wherein such at least one adhesive comprises a melting point greater than 150 degrees Fahrenheit. Also, it provides such a system wherein such at least one adhesive comprises primarily ethylene vinyl acetate. In addition, it provides such a system wherein such at least one adhesive comprises flexibility at room temperature.

In accordance with another preferred embodiment hereof, this invention provides a method, relating to laminating magnetizable laminates having at least one adhesive preventing delamination of magnetizable laminates exposed to direct sunlight and preventing fouling of cutting blades during cutting of magnetizable laminates, such method comprising the steps of: obtaining at least two layers of flexible material; wherein such at least two layers comprises at least one magnetizable layer structured and arranged to be capable of magnetization; and laminating such at least two layers of flexible material with at least one adhesive to form at least one flexible magnetizable laminate; and curing such at least one adhesive to form a virtual thermoset; wherein such at least one adhesive is resistant to transfer from such at least one flexible magnetizable laminate to the cutting blades during cutting of such at least one flexible magnetizable laminate; and wherein such at least one flexible magnetizable laminate is resistant to delamination on exposure to direct sunlight, during use.

In accordance with another preferred embodiment hereof, this invention provides a system, relating to preventing delamination of magnetizable laminates exposed to direct sunlight and relating to preventing fouling of cutting blades during cutting of magnetizable laminates, such system comprising: at least one magnetization accepter structured and arranged to accept magnetization; at least one indicia accepter structured and arranged to accept indicia; and at least one laminator structured and arranged to laminate such at least one magnetization accepter and such at least one indicia accepter to form at least one flexible magnetizable laminate; wherein such at least one laminator is resistant to transfer from such at least one flexible magnetizable laminate to the cutting blades during cutting of such at least one flexible magnetizable laminate; and wherein such at least one flexible magnetizable laminate is resistant to delamination during use in direct sunlight. And, it provides such a system wherein such at least one laminator comprises at least one hot-melt adhesive. Further, it provides such a system wherein such at least one laminator comprises at least one reactive hot-melt adhesive. Even further, it provides such a system wherein such at least one laminator comprises at least one virtually-thermosetable hot-melt adhesive. Moreover, it provides such a system wherein such at least one laminator comprises at least one humidity-curable adhesive structured and arranged to cure using humidity. Additionally, it provides such a system wherein such at least one laminator comprises primarily polyurethane. Also, it provides such a system wherein such at least one laminator comprises at least about 90% polyurethane. In addition, it provides such a system wherein such at least one laminator comprises at least about 95% polyurethane. And, it provides such a system wherein such at least one laminator comprises at least one thermoplastic hot-melt adhesive. Further, it provides such a system wherein such at least one laminator comprises a melting point greater than 150 degrees Fahrenheit. Even further, it provides such a system wherein such at least one laminator comprises primarily ethylene vinyl acetate. Even further, it provides such a system wherein such at least one laminator comprises flexibility at room temperature.

In accordance with another preferred embodiment hereof, this invention provides a system, relating to preventing delamination of magnetizable laminates exposed to direct sunlight and relating to preventing fouling of cutting blades during cutting of magnetizable laminates, such system comprising: magnetization accepter means for accepting magnetization; indicia accepter means for accepting indicia; and laminator means for laminating such magnetization accepter means and such indicia accepter means to form at least one flexible magnetizable laminate; wherein such laminator means is resistant to transfer from such at least one flexible magnetizable laminate to the cutting blades during cutting of such at least one flexible magnetizable laminate; and wherein such at least one flexible magnetizable laminate is resistant to delamination during use in direct sunlight. In accordance with preferred embodiments hereof, this invention provides for each and every novel feature, element, combination, step and/or method disclosed or suggested by this patent application.

According to another preferred embodiment of the present invention, this invention provides each and every novel feature, element, combination, step and/or method disclosed or suggested by this patent application.

BRIEF DESCRIPTION OF THE DRAWINGS

FIG. 3 shows a flowchart illustrating the preferred manufacturing process of FIG. 2.

FIG. 4 shows a diagrammatic view illustrating a preferred coating stage of an alternately preferred manufacturing process of the preferred embodiment of FIG. 1.

FIG. 5 shows a diagrammatic view illustrating a preferred adhering stage of the alternately preferred manufacturing process of the preferred embodiment of FIG. 1.

FIG. 6 shows a flowchart illustrating an alternately preferred manufacturing process of FIG. 4 and FIG. 5.

DETAILED DESCRIPTION OF THE BEST MODES AND PREFERRED EMBODIMENTS OF THE INVENTION

Figure 1:
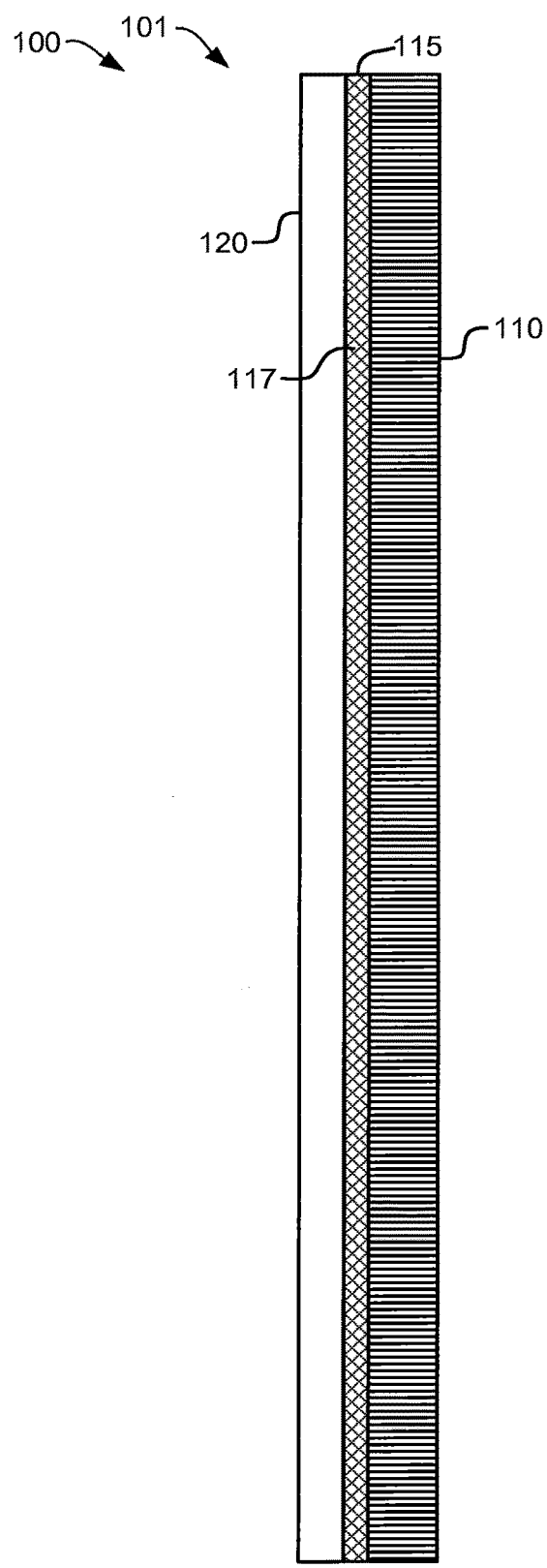
FIG. 1 shows a cross-sectional view, of a flexible magnetic sheet, illustrating a preferred embodiment of the present invention.

FIG. 1 shows a cross-sectional view of a flexible magnetic sheet illustrating a preferred embodiment of the present invention. FIG. 1 shows adhering system 100. Adhering system 100 preferably comprises flexible magnetic sheet 101, as shown. Flexible magnetic sheet 101 preferably comprises at least one magnetizable layer 110, at least one adhesive layer 115, and at least one writeable layer 120, as shown. Magnetizable layer 110 preferably comprises magnetizable material. Adhesive layer 115 preferably connects magnetizable layer 110 with writeable layer 120. Writeable layer 120 is preferably capable of holding indicia, preferably obtained through printing or alternately preferably obtained through writing.

Magnetizable layer 110 preferably comprises at least one magnetizable component (preferably ferrite particles) and preferably at least one binder. The at least one magnetizable component and the at least one binder are preferably homogeneously blended and shaped to form magnetizable layer 110 (at least herein embodying wherein said at least two layers comprises at least one magnetizable layer structured and arranged to be capable of magnetization). Magnetizable layer 110 is preferably flexible, preferably from flexibility properties of the at least one binder, and is preferably magnetizable, so as to be useful in magnetically adhering to a magnetic surface, preferably from ferromagnetic properties of the at least one magnetizable component. Magnetizable layer 110 is preferably smooth so that no surface treatment be required in adhering magnetizable layer 110 to writeable layer 120. Under appropriate circumstances, those of ordinary skill in the art will now appreciate that, under appropriate circumstances, considering such issues as cost, future technologies, etc., other arrangements of layers, such as, for example, a non-magnetic layer, layers utilizing other properties creating magnetic-like attraction, etc., may suffice.

Writeable layer 120 is preferably capable of being printed on. Writeable layer 120 preferably comprises bi-axially oriented polypropylene film ("BOPP"), alternately preferably paper, alternately preferably vinyl, or alternately preferably polypropylene. Upon reading the teachings of this specification, those of ordinary skill in the art will now appreciate that, under appropriate circumstances, considering such issues as cost, future technologies, etc., other materials providing additional functionality, such as, for example, cork, fabric, sandpaper, another magnetizable layer, paramagnetic materials, etc., may suffice Magnetizable sheet 101 (at least embodying herein at least one flexible magnetizable laminate comprising at least two layers) is preferably formed into a roll or alternately preferably cut into specific sizes based on customer desire.

Upon reading the teachings of this specification, those of ordinary skill in the art will now appreciate that, under appropriate circumstances, other arrangements of the sheet, such as, for example, sandpaper layer connected to magnetizable layer; cork layer connected to magnetizable layer; wood layer connected to magnetizable layer; decorative print layer connected to magnetizable layer; wallpaper connected to magnetizable layer; two magnetizable layers connected to one another with magnetic poles in a "repulsive" orientation; two magnetizable layers connected to one another with magnetic poles in an "attractive" orientation; two magnetizable layers connected to one another with "opposite" indicia on opposing sides (e.g., On/Off; Open/Closed, Stop/Go, etc.), etc., may suffice.

Adhesive layer 115 (at least embodying herein at least one adhesive structured and arranged to adhere said at least two layers together) preferably comprises adhesive 117 bonding magnetizable layer 110 with writeable layer 120. Adhesive 117 preferably comprises at least one hot-melt adhesive, preferably at least one reactive hot-melt adhesive, preferably at least one virtually-thermosetable hot-melt adhesive. Adhesive 117 preferably comprises polyurethane, alternately preferably ethylene vinyl acetate (a hot-melt adhesive), alternately preferably moisture-curing urethane adhesive. Upon reading the teachings of this specification, those skilled in the art will now appreciate that, under appropriate circumstances, considering such issues as cost, future technologies, available materials, etc., other adhesives, such as, for example, other polymers, dissipating chemical reagents, fusing cross-linking materials, etc., may suffice.

Adhesive 117 preferably bonds destructively to magnetizable layer 110 and writeable layer 120, meaning that once adhesive 117 is cured, the layers cannot be removed mechanically (by peeling, delamination, etc.) without mechanical destruction. Further, applying normal heat of about 110 degrees Fahrenheit preferably does not interfere with the bonding qualities of adhesive 117. Further, adhesive layer 115 preferably is non-tacky once bonded to magnetizable layer 110 and writeable layer 120. Adhesive 117 preferably is smoothly applied which provides for a quality print processing. Flexible magnetic sheet 101 preferably has no observable bumps, ridges, or streaks in adhesive layer 115; so writeable layer 120 is preferably likewise smooth for printing or writing.

Adhesive 117, when comprising polyurethane, is preferably durable, cross-link reacted, and cannot be reactivated after curing. The cross-linking is preferably non-reversible as occurs with a thermoset polymer. Additionally, adhesive 117 is preferably heat resistant to resist delamination in high temperatures, while also preferably remaining flexible at low temperatures. The Applicant has determined through testing that polyurethane remains flexible in cold temperatures. For example, at freezing (0 degrees Fahrenheit), the preferred polyurethane adhesives remain flexible (do not observably crack, distort, or bubble). Adhesive 117 preferably is solid, preferably not solvent based, and preferably comprises no volatile organic compounds. Adhesive 117 preferably is recyclable.

A preferred polyurethane adhesive for adhesive layer 115 comprises PURMELT® R-246C made available by Henkel Corporation of Elgin, Ill.

PURMELT® R-246C comprises about 95 percent to about 99 percent of a polyurethane prepolymer and about 1-3 percent of Methylene bisphenyl isocyanate (CAS No. 101-68-8). The following physical and chemical properties belong to PURMELT® R-246C:

Physical state: Solid
Color: Off-white
Odor: None
Odor Threshold: 0.4 ppm (4,4'-MDI)
Vapor pressure: <0.0001 mmHg @20° C. (68° F.) For MDI
pH: Not applicable
Boiling point/range: Not available
Melting point/range: 120° C. (250° F.)
Specific gravity: 1.1
Vapor density: Not available
Evaporation rate: Not applicable
Solubility in water: Insoluble. Reacts slowly with water to liberate carbon dioxide gas.
Partition coefficient (n-octanol/water): Not available
VOC content: 0 g/L An alternately preferred polyurethane adhesive is PURMELT® R-246CLV made available by Henkel Corporation of Elgin, Ill. PURMELT® R-246CLV has a viscosity of about 18,000 centipoise at about 180 degrees Fahrenheit and a humidity curing mechanism. PURMELT® R-246CLV is a one-component polyurethane reactive hot melt adhesive. PURMELT® R-246CLV cures through moisture to form a tough, strong, and virtually thermoset polymer. Unlike many thermoset polymers, a virtual thermoset polymer retains flexibility and has a melting point lower than the decomposition temperature, though higher that before curing. Thus, Adhesive 117, comprising a virtual thermoset polymer, preferably bonds using cross-linking, preferably increasing the melting point, but preferably maintains flexibility and recyclability. Further, another alternately preferable adhesive is Supergrip 2000™ H0005-03A by Bostik™ companies, a solvent-free, one component, moisture curing urethane adhesive which, once dispensed will react with ambient moisture to yield a cross-linked thermoset adhesive.

Figure 2:
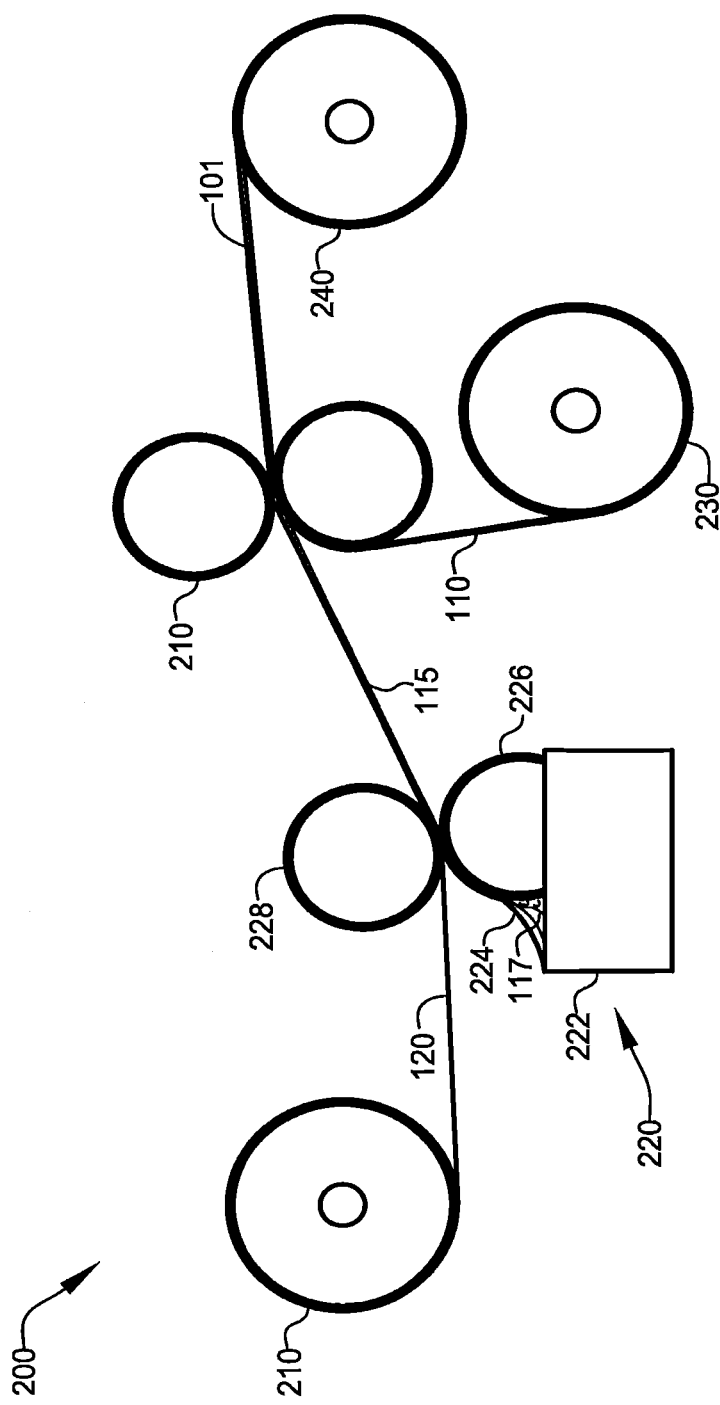
FIG. 2 shows a diagrammatic view illustrating a preferred manufacturing process of the preferred embodiment of FIG. 1.

FIG. 2 shows a diagrammatic view illustrating a preferred manufacturing process 200 of the preferred embodiment of FIG. 1. FIG. 3 shows a flowchart illustrating preferred manufacturing process 200 of FIG. 2. To construct magnetizable sheet 101, manufacturing process 200 begins with the step of Obtaining Magnetizable Layer and Writeable Layer 310 (at least embodying herein obtaining at least two layers of flexible material), in which magnetizable layer 110 and writeable layer 120 are obtained preferably as rolls of material (magnetizable-layer roll 230 and writeable-layer roll 210). Upon reading the teachings of this specification, those skilled in the art will now appreciate that, under appropriate circumstances, considering such issues as cost, product demand, future technologies, etc., other layer combinations, such as, for example, sandpaper layer connected to magnetizable layer; cork layer connected to magnetizable layer; wood layer connected to magnetizable layer; decorative print layer connected to magnetizable layer; wallpaper connected to magnetizable layer; two magnetizable layers connected to one another with magnetic poles in a "repulsive" orientation; two magnetizable layers connected to one another with magnetic poles in an "attractive" orientation; two magnetizable layers connected to one another with "opposite" indicia on opposing sides (e.g., On/Off; Open/Closed, Stop/Go, etc.), etc., may suffice.

In step Apply Adhesive 320, preferably, an increased temperature, preferably about 250 degrees Fahrenheit, is applied to a pre-selected amount of adhesive 117. Thus prepared, adhesive 117 is subsequently applied to a coating machine 220, preferably in a coating bath 222. Preferably, coating machine comprises a Gravure coater (as shown in FIG. 2), alternately preferably a roll coater, alternately preferably a slot die coater. Upon reading the teachings of this specification, those skilled in the art will now appreciate that, under appropriate circumstances, considering such issues as cost, available materials, future technologies, etc., other coating devices, such as, for example, Meyer rod coaters, blade-gap coaters, reverse-roll coaters, air-knife coaters, etc., may suffice.

Engraved roller 226, of coating machine 220, preferably collects adhesive from coating bath 222 and preferably applies adhesive 117 to writeable layer 120. Preferably, at least one doctor blade 224 wipes off excess adhesive from engraved roller 226 prior to application to writeable 120. At least one pressure roller 228 applies pressure to assist adhesion of adhesive 117 to writeable layer 120 from engraved roller 226. Coating machine 220 preferably coats adhesive 117 in a thin layer (adhesive layer 115) so that magnetizable layer 110 and writeable layer 120 will sandwich adhesive layer 115. Adhesive layer 115 preferably comprises a thickness of about 0.6 mil to about 1.5 mil. Upon reading the teachings of this specification, those skilled in the art will now appreciate that, under appropriate circumstances, considering such issues as cost, available materials, coating methods, etc., other thicknesses of adhesive may suffice.

Preferably the viscosity of adhesive 117 is kept at a pre-selected level, preferably to apply an even layer. PURMELT® R-246C has a viscosity of about 13,000 centipoise at about 250 degrees. Under appropriate circumstances, such as to achieve a thinner coat weight, the temperature applied to the adhesive may be increased to "thin" the coat weight. Preferably, coating machine 220 comprises a Gravure coater, as shown in FIG. 2, so that a consistent coat weight may be preferably deposited onto the desired layer(s). The Gravure coating structure (engraved roller 226) comprises engravings having a pre-determined depth so as to deposit a controlled coat weight onto a desired layer. For most printing applications, adhesive layer 115 has a preferred thickness of about 0.6 mil to about 1.5 mil.

After applying adhesive 117 forming adhesive layer 115, magnetizable layer 110 is preferably joined to writeable layer 120 with adhesive layer 115 between to form an adhesive bond, in step Join Layers 330. Adhesive layer 115 preferably is still viscous to promote complete bonding, during step Join Layers 330. The resulting bound and layered material (magnetizable sheet 101) preferably forms as all three layers (magnetizable layer 110, adhesive layer 115 and writeable layer 120) are pressed together through pressure rollers 210. Magnetizable sheet 101 preferably is rolled into magnetizable sheet roll 240 ready for final curing. The steps of Apply Adhesive 320 and Join Layers 330 at least embody herein laminating such at least two layers of flexible material with at least one adhesive to form at least one flexible magnetizable laminate.

After joining the layers, magnetizable sheet 101 is preferably cured, in step Cure Adhesive 340 (at least embodying herein curing such at least one adhesive to form a virtual thermoset). Curing of adhesive preferably uses humidity. Curing time is preferably dependent on humidity. Preferably, a cure time of 24 hours is preferred in most ambient humidity conditions (about 28 percent to about 70 percent relative humidity). Increasing the humidity level preferably decreases the time needed to cure the adhesive depending on the coat weight applied to the layers. Preferably, additional humidity may be preferably introduced by running the curing product though a humidified chamber, alternately preferably by misting the curing product, or alternately preferably curing the product in a humidity controlled room. Upon reading the teachings of this specification, those skilled in the art will now appreciate that, under appropriate circumstances, considering such issues as available materials, future technologies, costs, etc., other curing methods, such as, for example, electromagnetic radiation, temperature flux, vacuum, atmospheric adjustments, etc., may suffice.

As PURMELT® R-246C cures, it forms a virtually thermoset polymer. Applicant's testing has shown that the PURMELT® R-246C does not lose its thermoset polymer qualities at about 110 degrees Fahrenheit, yet remains flexible.

Applicant's subjected a sample of magnetizable sheet 101 with PURMELT® R-246C and Exxon Mobile Indigo Printable BOPP 970 LT-447 to a "peel test", more specifically a 90-degree peel at 12 inches/minute test. The peel test was performed with a CHEMINSTRUMENTS Adhesion Release Tester Model No. AR-1500. The adhesive coat weight was 0.001 inches. An inability to peel the magnetizable sheet from the Exxon Mobile Indigo Printable BOPP 970 LT-447 was observed.

Further, applicant subjected a sample of magnetizable sheet with Acucote P2000 pressure sensitive adhesive made available by Acucote Inc. of Graham, N.C. and Exxon Mobile Indigo printable BOPP (70 LT-447) to the same above peel test. Adhesive failure (i.e., the adhesive was removed from the substrate cleanly) and adhesive transfer (i.e., the adhesive transferred from the face stock to the substrate) were both observed.

In testing, Applicant has documented the lack of "build up" of adhesive 117 on a guillotine cutter blade. A blade test procedure was performed by cutting sheets having a magnetizable layer, a layer of PURMELT® R-246C, and a laminate layer into sheets sized about 12 inches by about 18 inches. One hundred sheets were heated to about 110 degrees Fahrenheit. The 100 heated sheets were cut 110 times with a guillotine paper cutter (such as manufactured by POLAR). Photographs of the cutting blades were taken every 20 cuts. The photographs show no observable adhesive residue on the blade after making 110 cuts. On the other hand, Applicant has observed that a pressure sensitive adhesive utilized in place of PURMELT® R-246C subjected to the above test will typically observably gather on the knife blade and be transferred to the material being cut after 20 cuts. This property of magnetizable sheets 101 is important in that die cut blades become warm during use and pressure sensitive adhesives "gum" up or foul the blades. This arrangement at least herein embodies wherein said at least one adhesive is resistant to transfer from said at least one flexible magnetizable laminate to the cutting blades during cutting of said at least one flexible magnetizable laminate; and this arrangement at least herein embodies wherein said at least one laminator is resistant to transfer from said at least one flexible magnetizable laminate to the cutting blades during cutting of said at least one flexible magnetizable laminate; and this arrangement at least herein embodies wherein said laminator means is resistant to transfer from said at least one flexible magnetizable laminate to the cutting blades during cutting of said at least one flexible magnetizable laminate.

In summary, Applicant prefers utilization of adhesive 117, preferably comprising at least one hot-melt adhesive, preferably at least one reactive hot-melt adhesive, preferably at least one virtually-thermosetable hot-melt adhesive, preferably primarily polyurethane, preferably at least about 90% polyurethane, preferably at least about 95% polyurethane, preferably PURMELT® R-246C. Applicant further prefers adhesive 117 comprising polyurethane curable by humidity, preferably raising the overall melting point while preferably remaining flexible at room temperature. In addition, Applicant prefers adhesive 117 that, after being cured, will not delaminate while exposed to direct sunlight or high temperature environments (above about 100 degrees Fahrenheit), during use (this arrangement at least herein embodying wherein said at least one flexible magnetizable laminate is resistant to delamination during use in direct sunlight). Further Applicant prefers adhesive 117 that, after being cured, is not tacky when exposed to normal cutting-machine operational temperatures (about 110 degrees Fahrenheit), so as to transfer essentially no residue to cutting blades.

FIG. 4 shows a diagrammatic view illustrating a preferred coating stage 205 of an alternately preferred manufacturing process 201 of the preferred embodiment of FIG. 1. FIG. 5 shows a diagrammatic view illustrating a preferred adhering stage 207 of alternately preferred manufacturing process 201 of the preferred embodiment of FIG. 1. FIG. 6 shows a flowchart illustrating alternately preferred manufacturing process 201 of FIG. 4 and FIG. 5. An alternately preferred adhesive 117, comprising ethylene vinyl acetate, preferably comprises HOT MELT NO. C53-133 PLW by Cattie Adhesive Solutions of Quakertown, Pa. HOT MELT NO. C53-133 PLW is a synthetic resin, having a white amber color, viscosity of about 1400-1900 centipoise at about 225 degrees Fahrenheit, viscosity of about 1100-1600 centipoise at about 250 degrees Fahrenheit, viscosity of about 400-600 at 300 degrees Fahrenheit, a softening point (ring and ball) at 160 degrees Fahrenheit, a speed of set of medium/fast, and no noticeable adverse effects after 100 hours at 350 degrees Fahrenheit. HOT MELT NO. C53-133 PLW is a thermoplastic.

In applying the HOT MELT NO. C53-133 PLW, manufacturing process 201 was preferred. Manufacturing process 201 preferably comprises step Obtaining Magnetizable Layer and Writeable Layer 310 like manufacturing process 200. Manufacturing process 201 further comprises 2 stages, first, coating stage 205, as shown in FIG. 4, and second, adhering stage 207, as shown in FIG. 5.

In coating stage 205, first, adhesive 117, comprising HOT MELT NO. C53-133 PLW, is applied to writeable layer 120, in step Apply Adhesive 320 (detailed above in manufacturing process 200). After applying adhesive 117 to form adhesive layer 115, adhesive layer 115 is allowed to cool, in step Cool Adhesive 325. Upon cooling, and thus inactivation of adhesive properties of adhesive layer 115, the combined material of writeable layer 120 and adhesive layer 115 is then wound onto a core to form coated-material roll 250, as shown in FIG. 4, completing coating stage 205 of manufacturing process 201.

A typical application temperature of HOT MELT NO. C53-133 PLW ranges between about 220 to about 300 degrees Fahrenheit. Preferably, HOT MELT NO. C53-133 PLW is applied at about 250 degrees Fahrenheit preferably using a slot die coating technique, alternately preferably using a Gravure coater, as shown in FIG. 4. Upon reading the teachings of this specification, those skilled in the art will now appreciate that, under appropriate circumstances, considering such issues as cost, available materials, future technologies, etc., other coating devices, such as, for example, Meyer rod coaters, blade-gap coaters, reverse-roll coaters, air-knife coaters, etc., may suffice.

In adhering stage 207, coated material from coated-material roll 250 and magnetizable layer 110 are then subsequently run together over at least one heated roller 215 (to reactivate adhesive 117) to bond the writeable layer 120 (at least embodying herein at least one indicia accepter structured and arranged to accept indicia; and at least embodying herein indicia accepter means for accepting indicia) to magnetizable layer 110 (at least embodying herein at least one magnetization accepter structured and arranged to accept magnetization; and at least embodying herein magnetization accepter means for accepting magnetization) with adhesive layer 115 sandwiched between, in step Join Layers Adding Heat 335. After being thus joined, magnetizable sheet 101 forms. Magnetizable sheet 101 is preferably allowed to cool in step Cool Adhesive 345. In manufacturing process 201, magnetizable sheet 101 is not cured further and adhesive 117 (at least embodying herein at least one laminator structured and arranged to laminate said at least one magnetization accepter and said at least one indicia accepter to form at least one flexible magnetizable laminate; and at least embodying herein laminator means for laminating said magnetization accepter means and said indicia accepter means to form at least one flexible magnetizable laminate) preferably stays as a thermoplastic, however adhesive 117, comprising HOT MELT NO. C53-133 PLW, has a high melting point so preferably prevents delamination except in temperatures unlikely to occur in normal use (above 220 degrees Fahrenheit). After cooling magnetizable sheet 101 is preferably rolled into magnetizable sheet roll 240.

In summary, Applicant alternately prefers utilization of adhesive 117, preferably comprising at least one hot-melt adhesive, preferably at least one thermoplastic hot-melt adhesive, preferably primarily ethylene vinyl acetate, preferably HOT MELT NO. C53-133 PLW. In this alternate preference, Applicant further prefers adhesive 117 comprising ethylene vinyl acetate with a melting point of greater than 150 degrees, while preferably remaining flexible at room temperature. In addition, in this alternate preference, Applicant prefers adhesive 117 that will not delaminate in direct sunlight or high temperature environments (above about 100 degrees Fahrenheit), during use. Further, in this alternate preference, Applicant prefers adhesive 117 that is not tacky when exposed to normal cutting-machine operational temperatures (about 110 degrees Fahrenheit), so as to transfer essentially no residue to cutting blades.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to preventing delamination of a magnetizable laminate exposed to direct sunlight and relating to preventing fouling of cutting blades during cutting of said magnetizable laminate, said system comprising:
   at least one flexible magnetizable laminate comprising:
      a magnetizable layer;
      a writeable layer; and
      a single layer of adhesive destructively bonding said magnetizable layer and writeable layer together, said single layer of adhesive comprising at least 90 wt % of a polyurethane, said adhesive being a flexible, solid, heat resistant, durable, non-tack, and non-reversibly cross-linked virtually thermoset polymer,
   wherein said magnetizable laminate is cured in a manner so that the single layer of adhesive is cured between said magnetizable layer and said writeable layer,
   wherein said single layer of adhesive is resistant to transfer from the flexible magnetizable laminate to the cutting blades during cutting and resistant to delamination during use in direct sunlight when cured; and
   wherein said single layer of adhesive has a thickness of 0.6 mil to 1.5 mil.

2. The system according to claim 1 wherein said single layer of adhesive comprises at least 95 wt % of said polyurethane.

3. The system according to claim 1 wherein said single layer of adhesive comprises 95-99 wt % of a polyurethane prepolymer and 1-3 wt % of methylene bisphenyl isocyanate.

4. The system according to claim 1 wherein said single layer of adhesive comprises compounded polyisobutylene rubber.

5. The system according to claim 1, wherein said single layer of adhesive is solvent-free.

6. The system according to claim 1, wherein said single layer of adhesive is flexible at room temperature.

7. The system according to claim 1, wherein said single adhesive layer has a structure or arrangement resulting when formed by applying the adhesive at 250° F. at the viscosity of 13,000 centipoise onto the writeable layer.

8. A method of manufacturing a flexible magnetizable laminate having a single layer of adhesive for preventing delamination of said magnetizable laminate exposed to direct sunlight and preventing fouling of cutting blades during cutting of magnetizable laminates, said method comprising the steps of:
supplying a writeable layer;
applying said single layer of adhesive heated to 250° F. with a viscosity of 13,000 centipoise onto said writeable layer, said layer of adhesive having a thickness of 0.6 mil to 1.5 mil;
supplying a magnetizable layer;
laminating said writeable and magnetizable layers together with said single layer of adhesive, said single layer of adhesive comprises at least 90 wt % of a polyurethane; and
curing said single layer of adhesive between said writeable layer and said magnetizable layer to obtain a flexible, solid, heat resistant, durable, non-tacky, and non-reversibly crosslinked virtually thermoset polyurethane adhesive layer between said writeable and magnetizable layers,
wherein said single layer of adhesive is resistant to transfer from the at least one flexible magnetizable laminate to the cutting blades during cutting and resistant to delamination during use in direct sunlight when cured.

9. The method according to claim 8 wherein said single layer of adhesive comprises 95-99 wt % of a polyurethane prepolymer and 1-3 wt % of methylene bisphenyl isocyanate.

10. The method according to claim 8, wherein said single layer of adhesive is solvent-free.

11. The method according to claim 8, wherein said single layer of adhesive is flexible at room temperature.

12. The method according to claim 8, wherein during a first stage the writeable layer is cooled after applying the heated adhesive to the writeable layer, and then during a second stage the magnetizable layer and writeable layer are joined together while adding heat to make the flexible magnetizable laminate.

13. A flexible magnetizable laminate system, comprising:
a flexible magnetizable laminate comprising at least two layers, the at least two layers comprising a writeable layer and a magnetizable layer; and
a cured single layer of adhesive located between the at least two layers, the cured adhesive structured and arranged to destructively bond the at least two layers together, the adhesive comprising at least 90 wt % of a polyurethane that is a flexible, solid, heat resistant, durable, non-tack, and non-reversibly cross-linked virtually thermoset polymer, the cured adhesive being resistant to transfer from the at least one flexible magnetizable laminate to cutting blades during cutting of the at least one flexible magnetizable laminate and resistant to delamination during use in direct sunlight,
wherein the single layer of adhesive has a thickness of 0.6 mil to 1.5 mil.

14. The system according to claim 13 wherein said single layer of adhesive comprises 95-99 wt % of a polyurethane prepolymer and 1-3 wt % of methylene bisphenyl isocyanate.

15. The system according to claim 13, wherein said single adhesive layer has a cured structure or arrangement resulting when formed by applying the adhesive at 250° F. at a viscosity of 13,000 centipoise onto the writeable layer.

16. The system according to claim 13, wherein said single adhesive layer has a structure or arrangement resulting when formed by applying the adhesive at 250° F. at a viscosity of 13,000 centipoise onto the writeable layer, and then cooling followed by joining the writeable layer and magnetizable layer together while adding heat to make the flexible magnetizable laminate.

17. A method of manufacturing a flexible magnetizable laminate, the method comprising the steps of:
providing a magnetizable layer;
providing a writeable layer;
providing an adhesive comprising at least 90 wt % polyurethane;
increasing the temperature of the adhesive to 250° F. to thin the adhesive to a viscosity of 13,000 centipoise;
applying a single layer of the thinned adhesive onto the writeable layer, the adhesive layer having a thickness of 0.6 mil to 1.5 mil;
laminating the magnetizable layer, single adhesive layer, and writeable layer together to form the flexible magnetic laminate;
applying pressure to the flexible magnetic laminate; and
curing the flexible magnetizable laminate so that the single layer of adhesive cures and destructively bonds the magnetizable and writeable layers together to form the flexible magnetizable laminate,
wherein the cured single layer of adhesive comprises a flexible, solid, heat resistant, durable, non-tacky, and non-reversibly cross-linked virtually thermoset polyurethane polymer; the cured single layer of adhesive being resistant to transfer from the flexible magnetizable laminate to the cutting blades during cutting of the flexible magnetizable laminate and resistant to delamination during use in direct sunlight.

18. The method according to claim 17 wherein said single layer of adhesive comprises 95-99 wt % of a polyurethane prepolymer and 1-3 wt % of methylene bisphenyl isocyanate.

19. The method according to claim 17, wherein the writeable layer is cooled after applying heated adhesive to the writeable layer, and then the magnetizable layer and writeable layer are joined together while adding heat to make the flexible magnetizable laminate.

* * * * *